(12) United States Patent
Goodzeit et al.

(10) Patent No.: US 8,714,492 B2
(45) Date of Patent: May 6, 2014

(54) NON-INTERFERING DEPLOYABLE RADIATOR ARRANGEMENT FOR GEO SPACECRAFT

(75) Inventors: Neil E. Goodzeit, Princeton, NJ (US); Hamilton Wong, Yardley, PA (US); David J. Hentosh, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 108 days.

(21) Appl. No.: 13/368,304

(22) Filed: Feb. 7, 2012

(65) Prior Publication Data

US 2013/0200220 A1 Aug. 8, 2013

(51) Int. Cl.
*B64G 1/52* (2006.01)
*B64G 1/58* (2006.01)

(52) U.S. Cl.
USPC ..................................................... 244/171.8

(58) Field of Classification Search
USPC ................... 244/171.8, 172.6, 171.7
See application file for complete search history.

(56) References Cited

U.S. PATENT DOCUMENTS

| 5,732,765 | A | * | 3/1998 | Drolen et al. | 165/41 |
|---|---|---|---|---|---|
| 5,743,325 | A | * | 4/1998 | Esposto | 165/41 |
| 5,787,969 | A | * | 8/1998 | Drolen et al. | 165/41 |
| 5,794,890 | A | * | 8/1998 | Jones et al. | 244/171.8 |
| 5,806,800 | A | * | 9/1998 | Caplin | 244/171.8 |
| 5,823,477 | A | * | 10/1998 | York | 244/171.8 |
| 5,833,175 | A | * | 11/1998 | Caplin | 244/158.1 |
| 5,884,868 | A | * | 3/1999 | Long et al. | 244/171.8 |
| 6,378,809 | B1 | | 4/2002 | Pon | |
| 6,854,510 | B2 | | 2/2005 | Low et al. | |
| 7,028,953 | B2 | * | 4/2006 | Sebata et al. | 244/171.8 |
| 7,036,772 | B2 | | 5/2006 | Walker et al. | |
| 7,174,950 | B2 | * | 2/2007 | Jacque et al. | 165/104.26 |
| 7,874,520 | B2 | * | 1/2011 | McKinnon et al. | 244/171.8 |
| 2004/0040691 | A1 | * | 3/2004 | Jacque et al. | 165/42 |
| 2005/0211850 | A1 | * | 9/2005 | Sebata et al. | 244/171.8 |
| 2007/0221787 | A1 | * | 9/2007 | McKinnon et al. | 244/171.8 |
| 2010/0243817 | A1 | * | 9/2010 | Mckinnon et al. | 244/171.8 |

* cited by examiner

*Primary Examiner* — Philip J Bonzell
(74) *Attorney, Agent, or Firm* — McDermott Will & Emery LLP

(57) ABSTRACT

A deployable radiator arrangement for cooling a geostationary earth orbit spacecraft is provided. In some aspects, the geostationary earth orbit spacecraft may comprise first and second deployable radiators mounted on an east or west surface of the spacecraft when stowed. The first and second deployable radiators are configured to rotate into a north and south facing position, respectively, when deployed. The geostationary earth orbit spacecraft may further comprise first and second fixed radiators disposed on a north and south surface of the spacecraft, respectively. The first and second deployable radiators are thermally coupled to the first and second fixed radiators, respectively.

22 Claims, 7 Drawing Sheets

NON-INTERFERING DEPLOYABLE RADIATOR ARRANGEMENT FOR GEO SPACECRAFT

STATEMENT AS TO RIGHTS TO INVENTIONS MADE UNDER FEDERALLY SPONSORED RESEARCH OR DEVELOPMENT

Not Applicable.

FIELD

The present invention generally relates to Geostationary Earth Orbit (GEO) spacecraft and, in particular, relates to a non-interfering deployable radiator arrangement for GEO spacecraft.

BACKGROUND

Conventionally, a GEO communications spacecraft may have deployable radiators that are stowed against the north or south spacecraft panels underneath the stowed solar arrays. The rationale for this is that the north or south panels of the spacecraft generally have the largest surface area and minimize interference with communications antennas that are mounted on the east and west sides of the spacecraft. Once in orbit and after the solar arrays have been deployed, the deployable radiators are rotated from the stowed position to the deployed position.

A drawback of this arrangement is that the deployable radiators must fit underneath the stowed solar array in the stowed position. Because of this, the deployable radiators generally include clearance cutouts and missing sections to avoid interfering with the solar array restraint mechanisms, harnessing, and/or the solar array driving mechanisms. The clearance cutouts decrease the thermal rejection capacity of the deployable radiators. In addition, the clearance cutouts complicate the design of the deployable radiators and its internal heat pipe arrangement. This deployment arrangement is more complicated, has greater potential for undesirable interferences, and is more costly to implement.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Various aspects of the subject technology provide a deployable radiator arrangement for GEO spacecraft in which the deployable radiators are stowed on the east and west panels of the spacecraft. This arrangement allows the deployable radiators to be deployed without interfering with solar arrays and communication antennas and without the need to incorporate cutouts in the deployable radiators, thereby improving the thermal rejection capabilities of the deployable radiators. Because clearance cutouts are not needed, the design of the deployable radiators and their respective internal heat pipe arrangement is less complicated. As a result, the deployable radiators may have a rectangular shape with a simple internal heat pipe arrangement and high radiator efficiency. The simple internal heat pipe arrangement may follow a general path within the deployable radiators without the need to accommodate clearance cutouts. In addition, the manufacture of the deployable radiators is more economical than deployable radiators used in conventional GEO spacecraft.

In accordance with one aspect of the subject technology, a geostationary earth orbit spacecraft may comprise first and second deployable radiators mounted on an east or west surface of the spacecraft when stowed. The first and second deployable radiators are configured to rotate into a north and south facing position, respectively, when deployed. The geostationary earth orbit spacecraft may further comprise first and second fixed radiators disposed on a north and south surface of the spacecraft, respectively. The first and second deployable radiators are thermally coupled to the first and second fixed radiators, respectively.

According to another aspect of the subject technology, a method for cooling a geostationary earth orbit spacecraft is provided. The method may comprise mounting first and second deployable radiators on an east or west surface of the spacecraft; mounting first and second fixed radiators on a north and south surface of the spacecraft, respectively; thermally coupling the first and second deployable radiators to the first and second fixed radiators, respectively; and deploying the first and second deployable radiators by rotating the first and second deployable radiators into a north and south facing position, respectively.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology. Like components are labeled with identical element numbers for ease of understanding.

Various aspects of the subject technology provide a method for cooling a GEO spacecraft without interfering with solar arrays and communication antennas, thereby increasing the thermal rejection capabilities of the deployable radiators by minimizing clearance cutouts. In one aspect, the design of the deployable radiators and their respective internal heat pipe arrangement is less complicated, and therefore more economical, than conventional GEO spacecraft.

Figure 1:
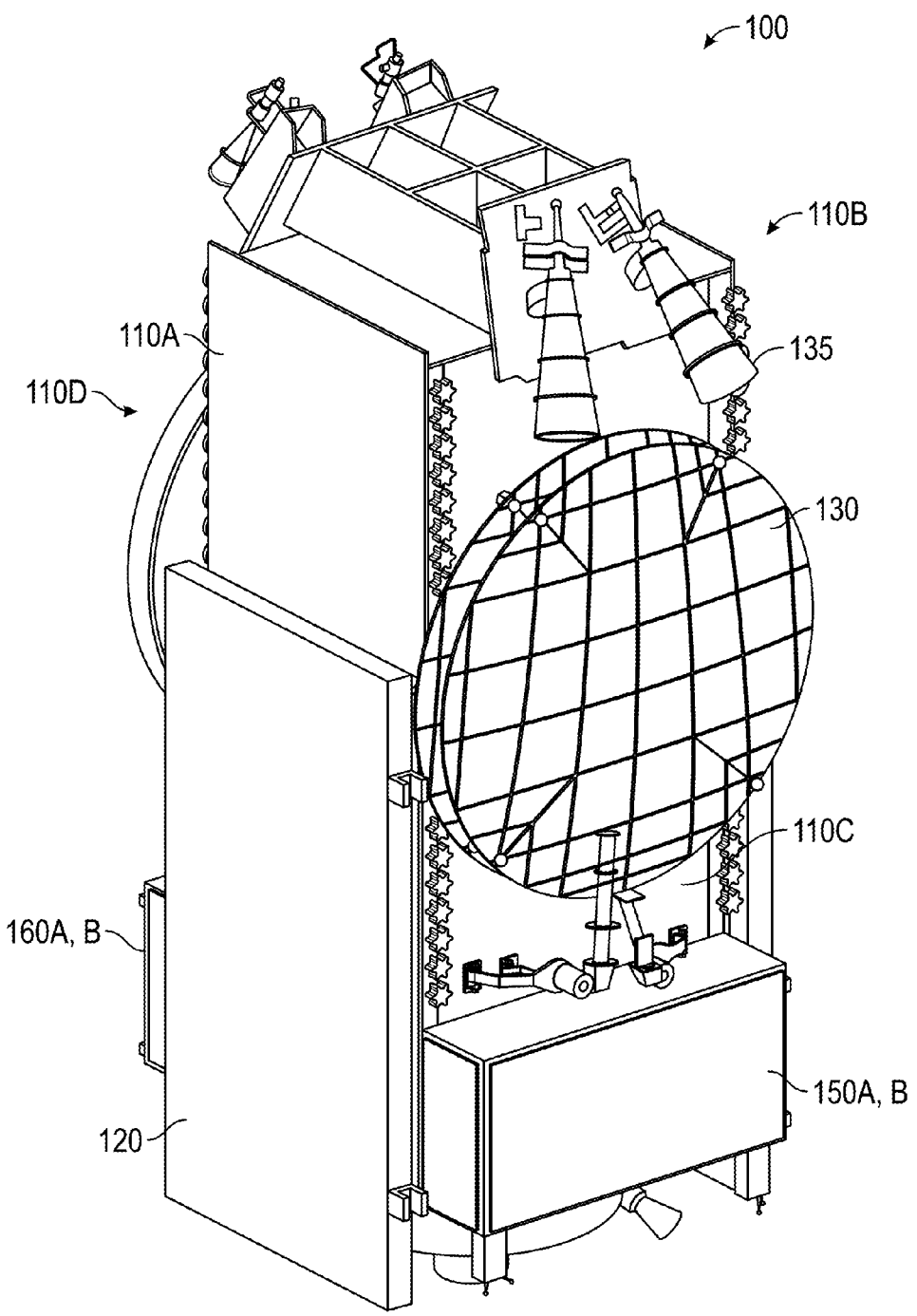
FIG. 1 illustrates a GEO spacecraft with deployable radiators in a stowed position, in accordance with various aspects of the subject technology.
Figure 3:
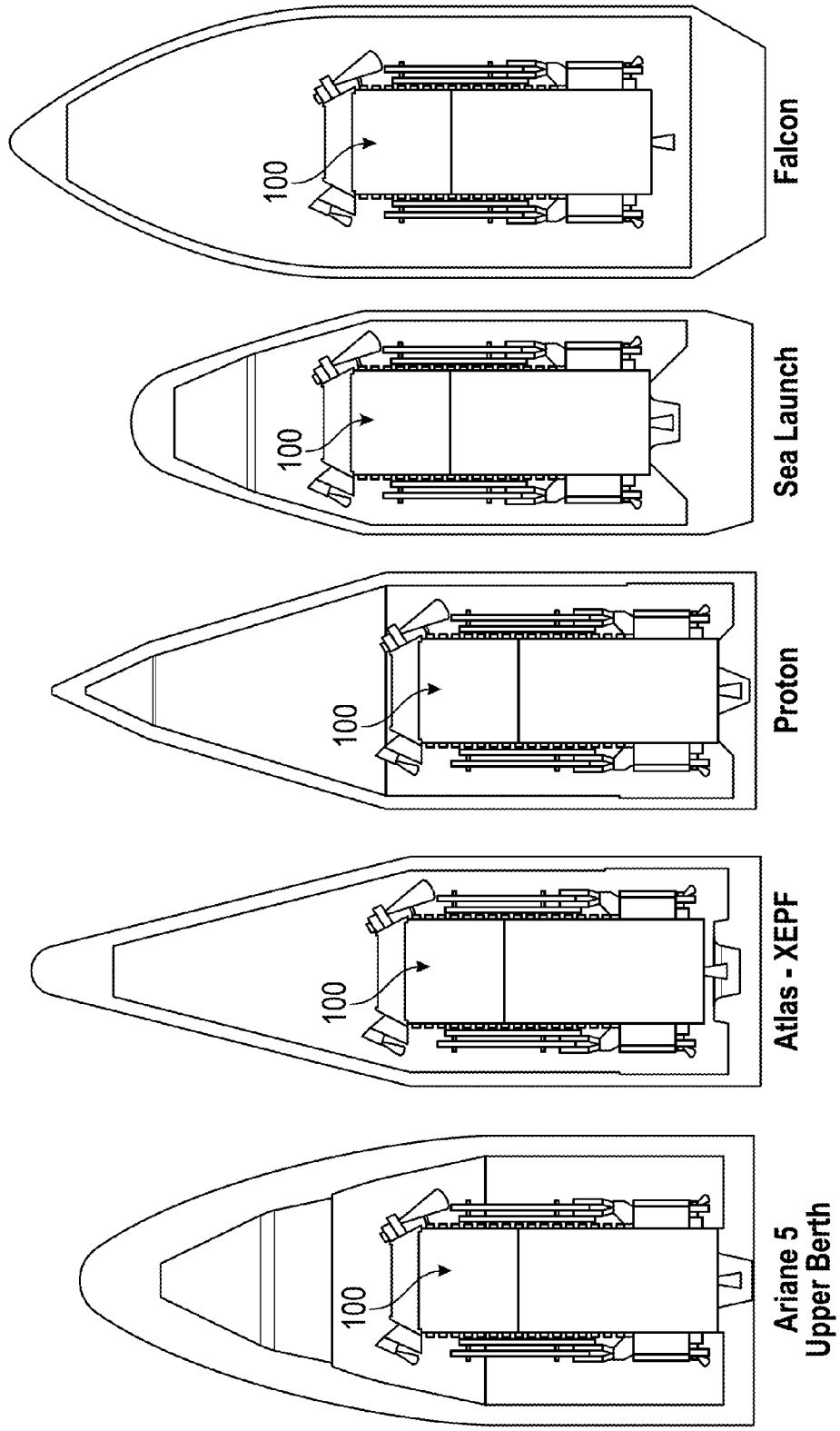
FIG. 3 illustrates a GEO spacecraft within launch vehicle fairings, in accordance with various aspects of the subject technology.

FIG. 1 illustrates a GEO spacecraft 100 with deployable radiators 150A-B, 160A-B in a stowed position, in accordance with various aspects of the subject technology. In some aspects, the spacecraft 100 may comprise solar arrays 120 disposed on a north 110A and/or south 110B face of the spacecraft 100. The spacecraft 100 may also comprise antenna reflectors 130 disposed on an east 110C and/or west 110D face of the spacecraft 100. The antenna reflectors 130 may be further translated toward an Earth-facing end of the spacecraft 100 to create a substantially flat region at the aft end of the spacecraft 100 for mounting of the deployable radiators 150A-B, 160A-B. In some aspects, translating the antenna reflectors 130 toward the Earth-facing end of the spacecraft 100 may require antenna feeds 135 to also be translated to maintain the proper antenna geometry. Referring to FIG. 3, the translation of the antenna feeds of the spacecraft 100 is within standard launch vehicle fairings.

First and second deployable radiators, 150A and 150B respectively, may be mounted on the east 110C face and adjacent to the aft end of the spacecraft 100 when stowed. Third and fourth deployable radiators, 160A and 160B respectively, may be mounted on the west 110D face and adjacent to the aft end of the spacecraft 100 when stowed. In one aspect, the first deployable radiator 150A may be configured to stow either on top of or under the second deployable radiator 150B. Alternatively, the first and second deployable radiators, 150A and 150B respectively, may be configured to be stowed side-by-side. In another aspect, the third deployable radiator 160A may be configured to stow either on top of or under the fourth deployable radiator 160B. Alternatively, the third and fourth deployable radiators, 160A and 160B respectively, may be configured to be stowed side-by-side. In some aspects, each deployable radiator 150A-B, 160A-B may have a width of about 3.3 ft and a length of 6.5 feet and have a total surface area of about 43 ft$^2$.

Because the deployable radiators 150A-B, 160A-B are mounted on the east 110C and west 110D face of the spacecraft 100 and adjacent to the aft end, the deployable radiators 150A-B, 160A-B have no clearance cutouts for accommodating the solar arrays 120 or the antenna reflectors 130. In some aspects, because the deployable radiators 150A-B, 160A-B have no clearance cutouts, the thermal rejection capacity of the deployable radiators 150A-B, 160A-B is higher than deployable radiators utilized in conventional GEO spacecraft that require clearance cutouts for accommodating solar arrays or antenna reflectors. For example, at roughly 40 deg C., an outward facing panel of the deployable radiator 150A may have a thermal rejection capability of 32 W/ft$^2$ and an inward facing panel may have a thermal rejection capability of 10 W/ft$^2$. The deployable radiators 150A-B, 160A-B may therefore each provide about 900 Watts of thermal rejection, thereby providing a total increase in thermal rejection for the deployable radiators 150A-B, 160A-B of about 3600 W, which for this example, represents a 50% increase in the thermal capability of the spacecraft 100.

Figure 2:
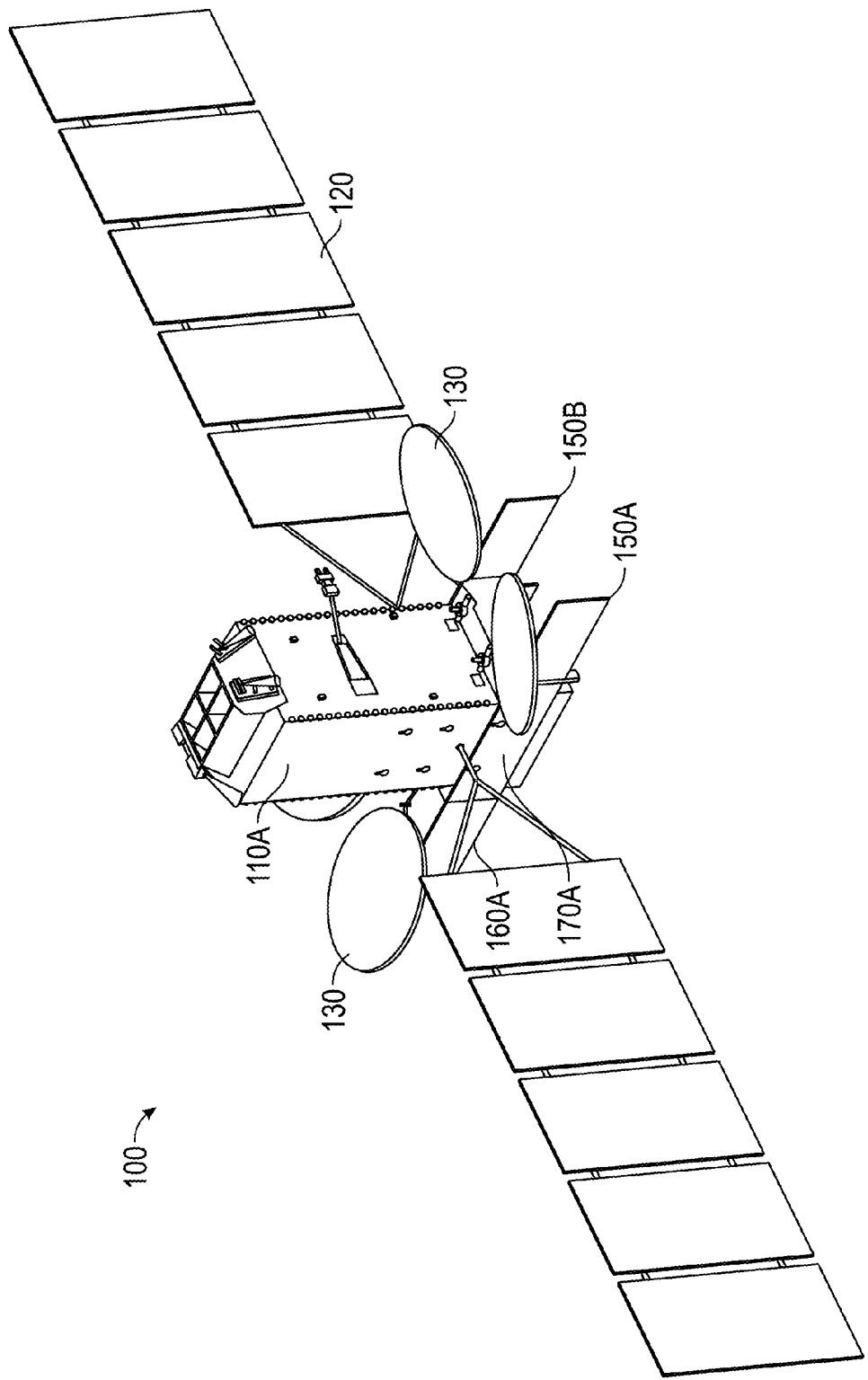
FIG. 2 illustrates a GEO spacecraft with deployable radiators in a deployed position, in accordance with various aspects of the subject technology.

FIG. 2 illustrates the GEO spacecraft 100 with deployable radiators 150A-B, 160A-B in a deployed position, in accordance with various aspects of the subject technology. In one aspect, the deployable radiators 150A-B, 160A-B are deployed after the spacecraft 100 has completed transfer-orbit operations, prior to entering communications service. In some aspects, the first and second deployable radiators, 150A and 150B respectively, may be configured to rotate into a north 110A and south 110B facing position, respectively, when deployed. For example, the first and second deployable radiators, 150A and 150B respectively, may rotate approximately 90 degrees from a stowed position to a deployed position either actively with a motor or actuator, or passively with a hinge and damper. In one aspect, the spacecraft 100 may comprise hinges and restraint mechanisms that are configured to secure the deployable radiators 150A-B, 160A-B for launch and facilitate deployment. In other aspects, the third and fourth deployable radiators, 160A and 160B respectively, may be configured to rotate into the north 110A and south 110B facing position, respectively, when deployed.

Figure 4A:
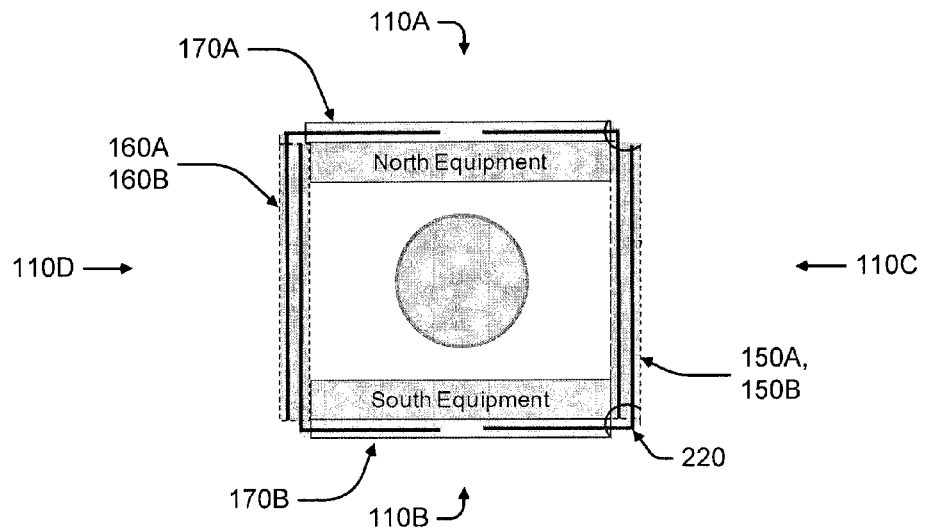
FIG. 4A illustrates an aft-end view of a GEO spacecraft with deployable radiators in a stowed position, in accordance with various aspects of the subject technology.
Figure 4B:
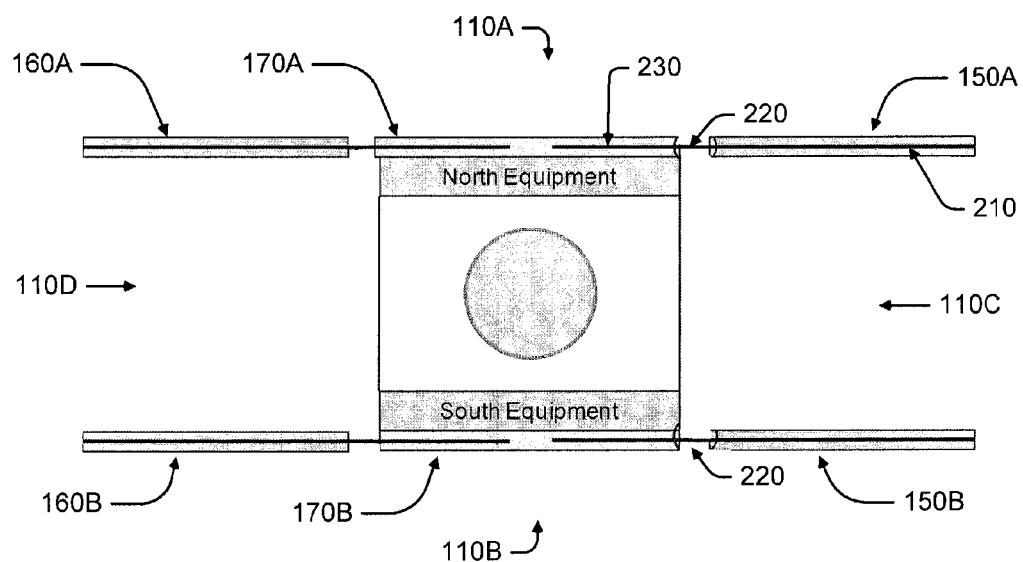
FIG. 4B illustrates an aft-end view of a GEO spacecraft with deployable radiators in a deployed position, in accordance with various aspects of the subject technology.

FIG. 4A illustrates an aft-end (anti-nadir panel) view of the GEO spacecraft 100 with deployable radiators 150A-B, 160A-B in the stowed position, in accordance with various aspects of the subject technology. In some aspects, the spacecraft 100 may further comprise first and second fixed radiators, 170A and 170B respectively, disposed on the north 110A and south 110B face of the spacecraft 100, respectively. The deployable radiators 150A-B, 160A-B may be thermally coupled to the first and second fixed radiators, 170A and 170B. For example, referring to FIG. 4B, first deployable radiator 150A may be thermally coupled to the first fixed radiator 170A. The second deployable radiator 150B may be thermally coupled to the second fixed radiator 170B. The third deployable radiator 160A may be thermally coupled to the first fixed radiator 170A. The fourth deployable radiator 160B may be thermally coupled to the second fixed radiator 170B.

Figure 5:
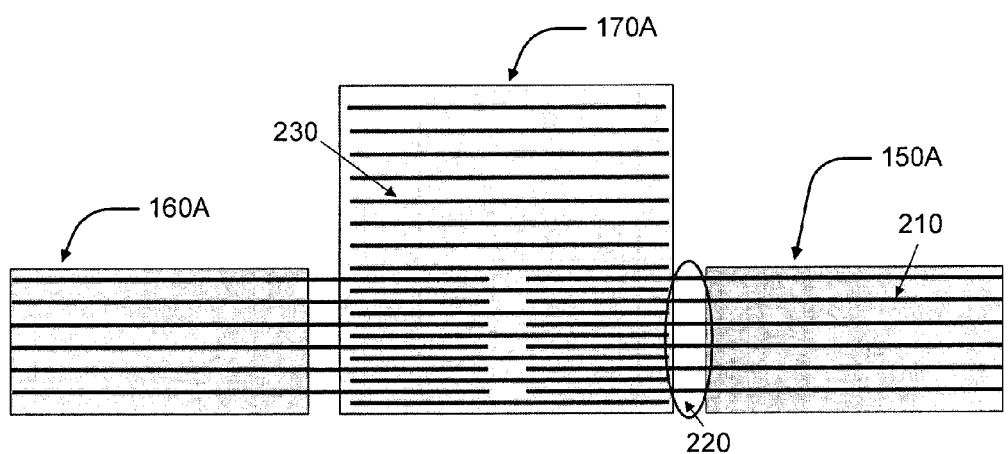
FIG. 5 illustrates a north-facing view of a GEO spacecraft with deployable radiators in a deployed position, in accordance with various aspects of the subject technology.

FIG. 5 illustrates a north-facing view of the GEO spacecraft 100 with deployable radiators 150A-B, 160A-B in the deployed position, in accordance with various aspects of the subject technology. In some aspects, heat pipe 230 may be disposed within the fixed radiators, 170A and 170B. Heat pipe 230 may be thermally coupled to heat pipe 210 disposed within the deployable radiators 150A-B, 160A-B with flexible sections 220. In one aspect, the flexible sections 220 facilitate rotation of the deployable radiators 150A-B, 160A-B with respect to the fixed radiators, 170A and 170B. For example, the flexible sections 220 may flex and/or bend about 90-180 degrees to facilitate stowage and deployment. This flexible section 220 also acts to transport heat from the fixed radiator to the deployable radiator. In other aspects, the flexible section 220 may be partially embedded within the fixed radiators 170A and 170B and bonded to the heat pipe 230 and also partially embedded within the deployable radiators 150A-B, 160A-B and bonded to the heat pipe 210. In some aspects, because there are no clearance cutouts in the deployable radiators 150A-B, 160A-B, straight heat pipe sections can be used, which may increase thermal rejection performance and reduce cost.

Figure 6:
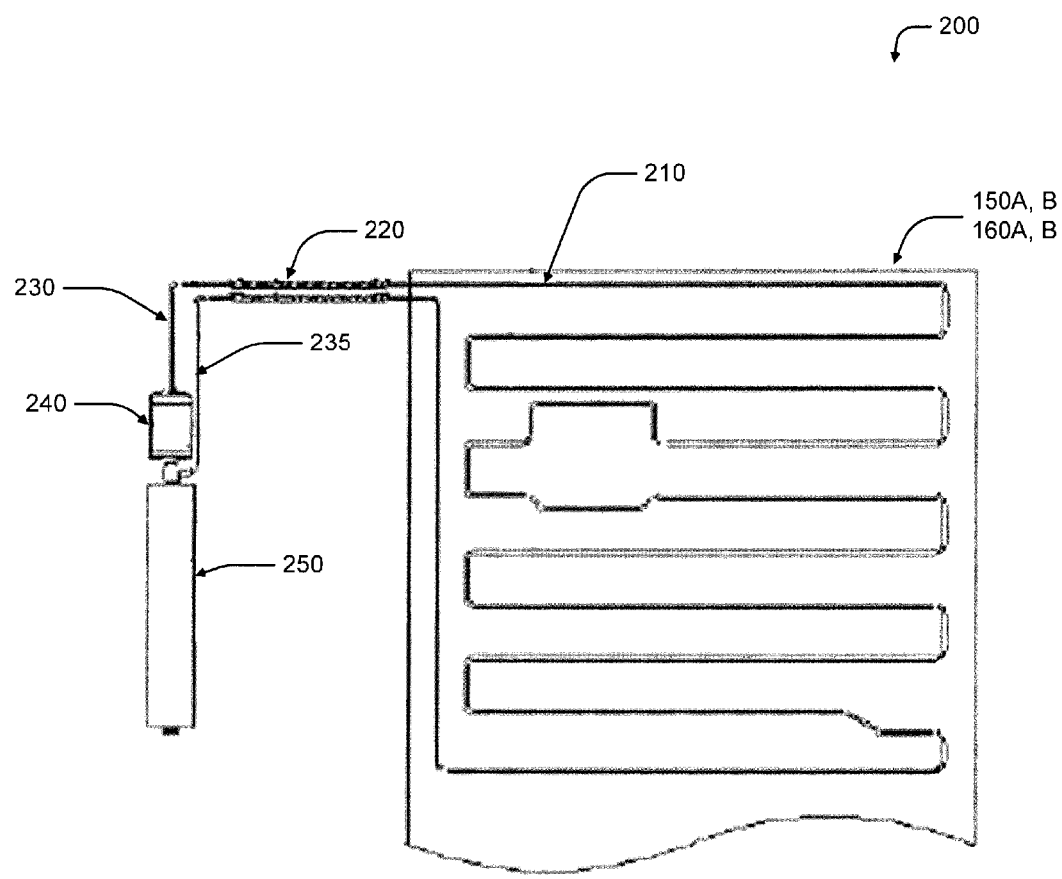
FIG. 6 illustrates a heat pipe arrangement, in accordance with various aspects of the subject technology.

FIG. 6 illustrates a heat pipe arrangement 200, in accordance with various aspects of the subject technology. In one aspect, an evaporator pump 250 may be configured to acquire heat and evaporate a liquid to a vapor. In some aspects, the heat pipe 235 may be configured to transport the heated vapor from the evaporator pump 250 to a colder area where heat from the heated vapor may be released, thereby condensing the vapor into a liquid. For example, the heat pipe 235 may transport the heated vapor to the deployable radiators 150A-B, 160A-B, via heat pipe 210, for cooling and condensing of the heated vapor into the liquid. The liquid may, for example, be ammonia liquid. After the vapor is condensed into the liquid, the liquid may continue along heat pipe 210, flexible section 220, and heat pipe 230 to an accumulator 240 and the evaporator pump 250 to continue the cooling cycle. The heat pipe 210, 230, and 235 may comprise smooth small diameter tubing made of aluminum or stainless steel.

Although the heat pipe arrangement 200 described above may be referred to as a loop heat pipe system (LHP), it is understood that other heat pipe arrangements may be used. For example, the heat pipe arrangement 200 may utilize flexible heat pipes arranged to connect the deployable radiator to the fixed radiator. Alternatively, a LHP system that has two connections to the deployable radiator, i.e., to the vapor side and the liquid side, may be utilized. In this example, rather than using a plurality of individual pipes, a single pipe would serpentine through the deployable panel as shown in FIG. 6.

Figure 7:
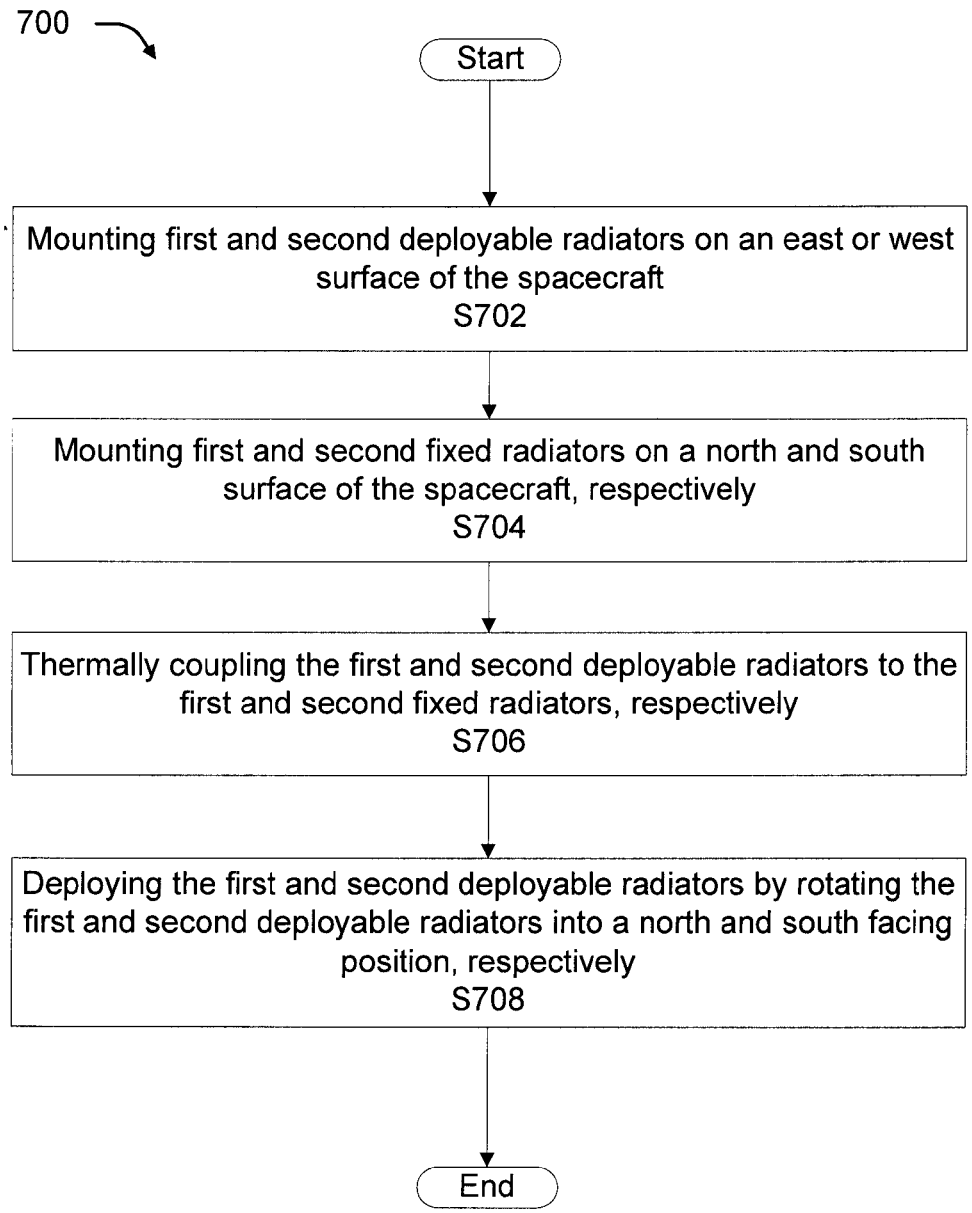
FIG. 7 illustrates an example of a method for cooling a GEO spacecraft, in accordance with various aspects of the subject technology.

FIG. 7 illustrates an example of a method 700 for cooling a GEO spacecraft, in accordance with various aspects of the subject technology. The method 700 comprises: mounting first and second deployable radiators on an east or west surface of the spacecraft (S702); mounting first and second fixed radiators on a north and south surface of the spacecraft, respectively (S704); thermally coupling the first and second deployable radiators to the first and second fixed radiators, respectively (S706); and deploying the first and second deployable radiators by rotating the first and second deployable radiators into a north and south facing position, respectively (S708).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A geostationary earth orbit spacecraft comprising:
   first and second deployable radiators mounted on an east or west surface of the spacecraft when stowed, the first and second deployable radiators being configured to rotate into a north and south facing position, respectively, when deployed;
   first and second fixed radiators disposed on a north and south surface of the spacecraft, respectively, the first and second deployable radiators being thermally coupled to the first and second fixed radiators, respectively; and
   one or more heat pipes comprising a flexible portion configured to transport heat from within a respective fixed radiator to within a respective deployable radiator, the flexible portion configured to facilitate rotation of the respective deployable radiator with respect to the respective fixed radiator, the flexible portion being partially embedded within the respective fixed radiator and partially embedded within the respective deployable radiator.

2. The geostationary earth orbit spacecraft of claim 1, further comprising:

third and fourth deployable radiators mounted on an opposite surface from the first and second deployable radiators when stowed,
wherein the third and fourth deployable radiators are configured to rotate into the north and south facing position, respectively, when deployed; and
wherein the third and fourth deployable radiators are thermally coupled to the first and second fixed radiators, respectively.

3. The geostationary earth orbit spacecraft of claim 1, wherein the heat pipe is further configured to transport a heated vapor from an evaporator pump to the first deployable radiator for cooling and condensing of the heated vapor into a liquid, wherein the liquid is returned to the evaporator pump by the heat pipe.

4. The geostationary earth orbit spacecraft of claim 1, wherein the east or west surface of the spacecraft is substantially flat.

5. The geostationary earth orbit spacecraft of claim 1, wherein the first and second deployable radiators have no cutouts for accommodating a solar array.

6. The geostationary earth orbit spacecraft of claim 1, wherein the first and second deployable radiators have no cutouts for accommodating an antenna.

7. The geostationary earth orbit spacecraft of claim 1, wherein each of the first and second deployable radiators have a surface area of about 43 ft2.

8. The geostationary earth orbit spacecraft of claim 1, wherein each of the first and second deployable radiators provides about 900 Watts of thermal rejection.

9. The geostationary earth orbit spacecraft of claim 1, wherein each of the first and second deployable radiators are configured to rotate approximately 90 degrees from a stowed position to a deployed position.

10. The geostationary earth orbit spacecraft of claim 9, wherein the stowed position for the first deployable radiator is on top of the second deployable radiator.

11. The geostationary earth orbit spacecraft of claim 9, wherein the stowed position for the second deployable radiator is on top of the first deployable radiator.

12. A method for cooling a geostationary earth orbit spacecraft, the method comprising:
mounting first and second deployable radiators on an east or west surface of the spacecraft;
mounting first and second fixed radiators on a north and south surface of the spacecraft, respectively;
thermally coupling the first and second deployable radiators to the first and second fixed radiators, respectively; and
deploying the first and second deployable radiators by rotating the first and second deployable radiators into a north and south facing position, respectively;
disposing at least a flexible portion of a heat pipe between a respective fixed radiator and a respective deployable heater, the heat pipe configured to transport heat from within the respective fixed radiator to within the respective deployable radiator, wherein the flexible portion of the heat pipe is configured to facilitate rotation of the respective deployable radiator with respect to the respective fixed radiator, the flexible portion being partially embedded within the respective fixed radiator and partially embedded within the respective deployable radiator.

13. The method of claim 12, wherein the method further comprises:
mounting third and fourth deployable radiators on an opposite surface from the first and second deployable radiators;
thermally coupling the third and fourth deployable radiators to the first and second fixed radiators, respectively; and
deploying the third and fourth deployable radiators by rotating the third and fourth deployable radiators into the north and south facing position, respectively.

14. The method of claim 12, wherein the method further comprises:
transporting a vapor via the heat pipe from an evaporator pump to the first deployable radiator;
cooling and condensing the heated vapor into a liquid; and
returning the liquid via the heat pipe to the evaporator pump.

15. The method of claim 12, wherein the east or west surface of the spacecraft is substantially flat.

16. The method of claim 12, wherein the first and second deployable radiators have no cutouts for accommodating a solar array.

17. The method of claim 12, wherein the first and second deployable radiators have no cutouts for accommodating an antenna.

18. The method of claim 12, wherein each of the first and second deployable radiators have a surface area of about 43 ft2.

19. The method of claim 12, wherein each of the first and second deployable radiators provides about 900 Watts of thermal rejection.

20. The method of claim 12, wherein the rotating further comprises rotating each of the first and second deployable radiators approximately 90 degrees from a stowed position to a deployed position.

21. The method of claim 20, wherein the stowed position for the first deployable radiator is on top of the second deployable radiator.

22. The method of claim 20, wherein the stowed position for the second deployable radiator is on top of the first deployable radiator.

* * * * *